United States Patent
Sakraschinsky et al.

(10) Patent No.: US 8,550,255 B2
(45) Date of Patent: Oct. 8, 2013

(54) FILTER DEVICE AND FILTER ELEMENT

(75) Inventors: Michael Sakraschinsky, St. Ingbert (DE); Norbert Sann, Riegelsberg (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 113 days.

(21) Appl. No.: 12/733,727

(22) PCT Filed: Jul. 24, 2008

(86) PCT No.: PCT/EP2008/006056
§ 371 (c)(1),
(2), (4) Date: Jun. 21, 2010

(87) PCT Pub. No.: WO2009/043403
PCT Pub. Date: Apr. 9, 2009

(65) Prior Publication Data
US 2010/0294711 A1    Nov. 25, 2010

(30) Foreign Application Priority Data
Sep. 27, 2007  (DE) .......................... 10 2007 046 209

(51) Int. Cl.
*B01D 35/30* (2006.01)
*B01D 35/00* (2006.01)
*B01D 35/28* (2006.01)
*B01D 29/00* (2006.01)

(52) U.S. Cl.
USPC ........... 210/453; 210/232; 210/435; 210/437; 210/440; 210/443; 210/444; 210/445; 210/450; 210/451; 210/455; 210/457

(58) Field of Classification Search
USPC ......................................... 210/450
See application file for complete search history.

(56) References Cited

U.S. PATENT DOCUMENTS

| | | | |
|---|---|---|---|
| 4,721,563 A | 1/1988 | Rosaen | |
| 5,753,120 A * | 5/1998 | Clausen et al. | 210/438 |
| 6,308,836 B1 | 10/2001 | Guichaoua et al. | |
| 2002/0158006 A1* | 10/2002 | Thomas | 210/440 |
| 2003/0226800 A1 | 12/2003 | Brown et al. | |
| 2007/0181481 A1 | 8/2007 | Reynolds et al. | |
| 2010/0032359 A1* | 2/2010 | Gillenberg et al. | 210/232 |

FOREIGN PATENT DOCUMENTS

| | | |
|---|---|---|
| DE | 1 949 742 | 11/1966 |
| DE | 196 34 720 A1 | 3/1998 |
| DE | 200 11 003 U1 | 11/2001 |
| EP | 0 844 012 A2 | 5/1998 |
| EP | 0 891 214 B1 | 1/1999 |
| EP | 1 287 871 A1 | 3/2003 |
| JP | 10-146503 | 5/1998 |
| WO | WO 97/16235 A1 | 5/1997 |
| WO | WO 2008/068237 A1 | 6/2008 |

* cited by examiner

*Primary Examiner* — Benjamin Kurtz
(74) *Attorney, Agent, or Firm* — Roylance, Abrams, Berdo and Goodman LLP

(57) ABSTRACT

A filter device having a filter element (9) forming a body extending along a longitudinal axis received in a housing (1) closed by a cover part (3). A sealing arrangement (49) is provided to form a fluid-tight seal between the housing (1) and the cover part (3). The sealing arrangement (49) is a component of a filter element (9) and is fixed to a sealing carrier (48) rigidly connected to the filter element.

8 Claims, 4 Drawing Sheets

FILTER DEVICE AND FILTER ELEMENT

FIELD OF THE INVENTION

The invention relates to a filter device with a filter element forming a body extending along the longitudinal axis and be received in a housing closed by a cover part. A sealing arrangement forms a fluid-tight sealing between the housing and the cover part. The invention furthermore relates to a filter element for the filter device.

BACKGROUND OF THE INVENTION

Filter devices for receiving filter elements are readily available on the market in a plurality of embodiments, for example, EP 1 287 871 A1 or EP 0 891 214 B1. In the operation of these filter devices, the filter element must be changed at specific time intervals. This changing must take place at comparatively short time intervals when there are large volumetric flows to be filtered and/or the fluids are more heavily fouled. In such filter devices, the installation processes for changing the filter elements are desired to be simple and uncomplicated, with reliable sealing between the housing and cover part, even at high pressure levels. To ensure in each changing process that the sealing arrangement between the cover part and housing is installed correctly, the corresponding sealing element must be correctly placed and the installed sealing element must be of the type with the correct dimensions. If installation of the sealing element is forgotten when the elements are being replaced, the risk of a malfunction exists, resulting in environmental pollution.

SUMMARY OF THE INVENTION

An object of the invention is to provide a filter device in which the process of changing the filter element can be carried out especially easily and reliably.

According to the invention, this object is basically achieved by a filter device where the sealing arrangement as a component of the filter element is fixed on a seal carrier securely connected to it. In the installation processes for changing the filter element the aforementioned error sources are reliably avoided. Since each time the element is changed, the sealing arrangement as a component of the filter element is automatically changed at the same time, the risks are avoided that installation of the pertinent sealing element will be inadvertently forgotten, and that an incorrect sealing element will be installed. To prevent these hazards, in conventional solutions an O-ring is an additional part added to the replacement filter elements, thereby complicating the logistics. Nor does this conventional solution ensure that the additional part is in fact also installed.

In especially advantageous embodiments the seal carrier is formed by a peripheral part radially offset from the central part of the end cap relative to the longitudinal axis. This end cap is provided on the end of the filter element associated with the cover part and forming an enclosure for its filter medium.

Preferably, the peripheral part forming the seal carrier is connected to the central part of the end cap by radially running crosspieces. The intermediate spaces between the crosspieces in the operating state of the device form fluid passages between a fluid duct in the cover part and the outside of the filter element. In that the seal carrier is connected to the central region of the pertinent end cap solely by radial crosspieces, the flow path for fluid entry from the cover part into the interior of the housing is relatively unobstructed.

In preferred embodiments in which the sealing arrangement has an annular body with an inner retaining rib projecting radially inward and secured in a peripheral annular groove on the peripheral part of the filter element forming the seal carrier, the sealing annular body is easily and securely fixed on the seal carrier.

Especially secure retention of the sealing arrangement is ensured in exemplary embodiments in which the sealing arrangement has a profile ring seal with a radially inner recess securingly engaged by a dovetail-shaped outer ring of the peripheral part of the filter element forming the seal carrier.

Especially reliable sealing is ensured when this profile ring seal has two sealing lips opposite one another in the axial direction with each lip forming one sealing region relative to the cover part and the housing.

The subject matter of the invention is also a filter element for a filter device.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure and which are schematic and not to scale.

DETAILED DESCRIPTION OF THE INVENTION

Figure 1:
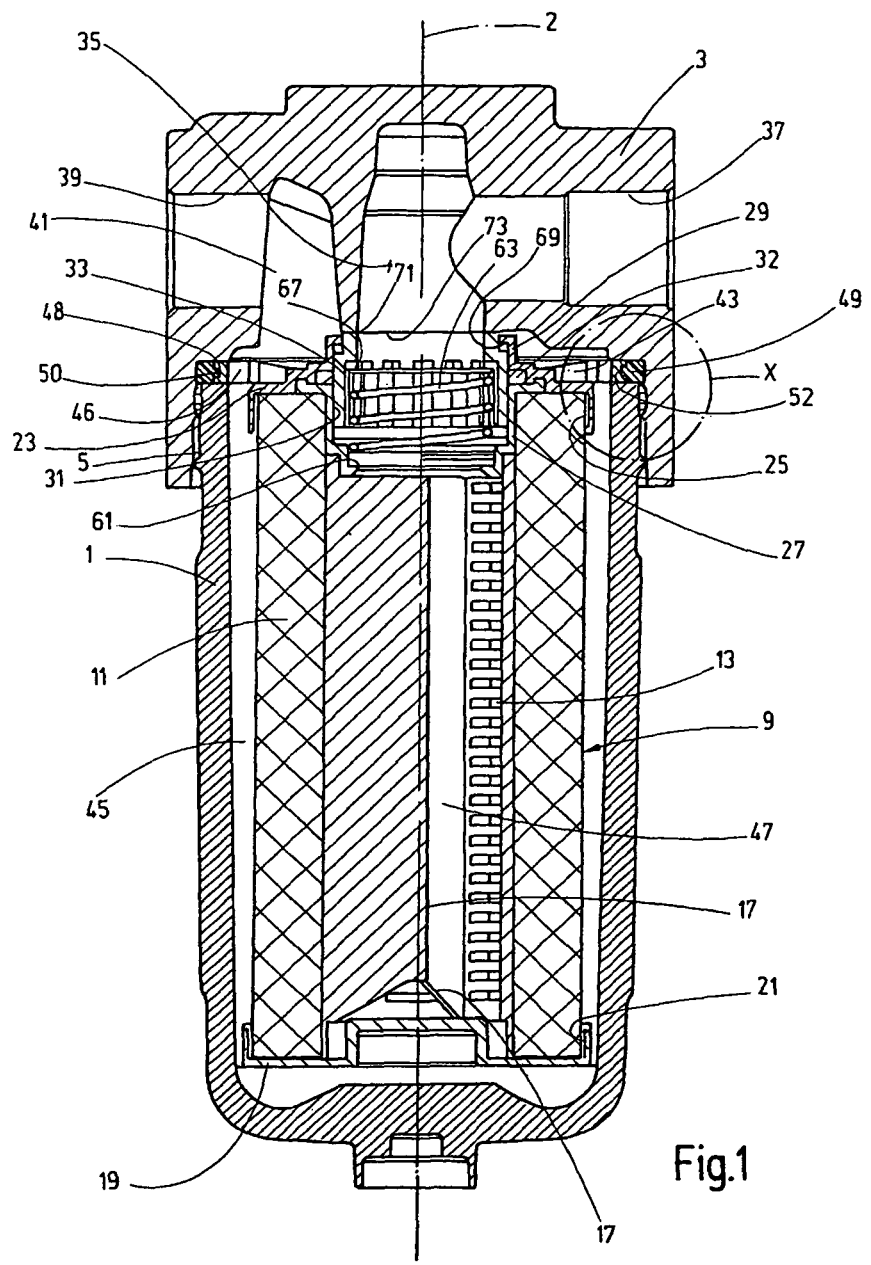
FIG. 1 is a side elevational view in section of a filter device according to a first exemplary embodiment of the invention, drawn schematically simplified and on a slightly reduced scale compared to a practical embodiment.

A cup-shaped filter housing 1 is largely circularly cylindrical and is closed on the bottom. The housing upper end can be closed by a cover part 3 detachably joined to the housing 1 via a screw connection 5. The housing 1 can receive a filter element 9 a conventional hollow cylindrical filter medium 11, for example in the form of layers of filter mat or a multilayer, folded, or pleated filter body surrounding a tubular support body 13 concentric to the longitudinal axis 2 and injection molded from plastic material. The support body, as is most apparent in FIG. 3, has a succession of peripheral circular rings 15 spaced apart from one another, only a few of the rings are numbered in the figures are conventional for these support bodies 13. Support body 13 is connected to a carrier located inside and made as a star which is three-pointed in cross section, with three points 17. On the end associated with the bottom of the cup of the housing 1, the filter element 9 is closed by a bottom cap 19 of plastic material forming an enclosure 21 for the filter medium 11. On the opposite end, an end cap 23 likewise formed from plastic material forms the termination of the filter element 9 facing the cover part 3. The end cap 23 in a similar manner as the bottom cap 19 forms an enclosure 25 for the pertinent end of the filter medium 11.

Figure 3:
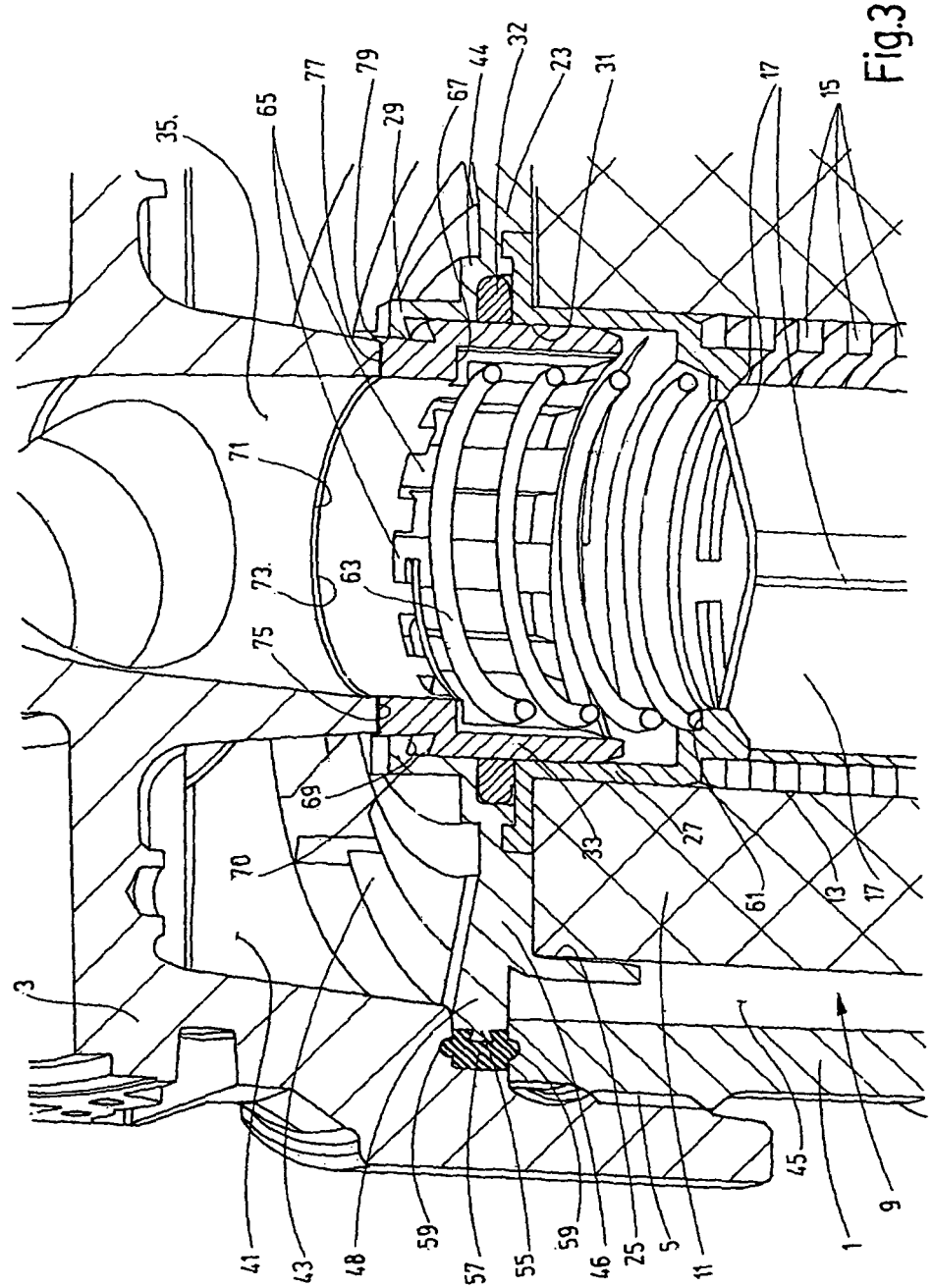
FIG. 3 is a partial perspective view in section greatly enlarged compared to FIG. 1 and showing only the head part of a filter device according to a second exemplary embodiment of the invention.

As can be seen most clearly in FIG. 3, on the radially inside region of the enclosure 25, a hollow body 27 together with an extension 29 projects axially on the radially inside end of the end cap 23 in the direction to the cover part 3 and forms a circularly cylindrical guide 31. A sleeve body 33 is guided in cylindrical guide 31 to be axially displaceable. Between the hollow body 27 and the extension 29, a seat is formed for a sealing element 32 sealing the sleeve body 33 relative to the guide 31. The sleeve body 33 is used as a movable coupling part of a connecting means or part for producing a fluid connection between the filter element 9 and the fluid duct 35 in the cover part 3.

As illustrated in FIG. 1, the fluid duct 35 in the cover part 3 is connected to the fluid outlet 37 for the cleaned fluid. A fluid inlet 39 is located in the cover part 3 opposite outlet 37 for the fluid to be cleaned and is connected in the cover part 3 to a second fluid duct 41 for conveying the flow of fluid to be cleaned via inflow openings 43 in the end cap 23 into the annulus 45 on the outside of the filter medium 11 forming the contaminated side of the filter device. From the outside of the filter medium 11, the fluid to be cleaned passes through the filter medium 11 from the outside to the inside and reaches the inner filter cavity 47 forming the clean side. From the inner filter cavity 47, the cleaned fluid travels through the sleeve body 33 forming the coupling part of the connecting means to the fluid duct 35 of the cover part 3 and then to the fluid outlet 37.

In the present invention, the sealing arrangement forming the fluid-tight sealing between the cover part 3 and the housing 1 is a component of the filter element 9. More accurately, the sealing arrangement is permanently fixed on the filter element 9 so that when the filter element is changed, without special effort of the personnel carrying out the changing process, the sealing arrangement is automatically replaced. In these examples the sealing arrangement is tightly joined to the end cap 23 forming the termination of the filter element on the end associated with the cover part 3. For this purpose, crosspieces 46 are molded in one piece onto the central region 44 of the end cap 23. In these examples, six crosspieces 46 are at the same distance from one another project radially relative to the longitudinal axis 2, protruding radially beyond the enclosure 25. On their outer ends, crosspieces 46 are connected to a ring-shaped peripheral part 48 used as the seal carrier on which the sealing arrangement is permanently fixed. The intermediate spaces between the crosspieces 46 on the outside of the central region 44 of the end cap form truncated sector-shaped inflow openings 43 for the entry of the fluid to be cleaned into the filter element 9.

Figure 2:
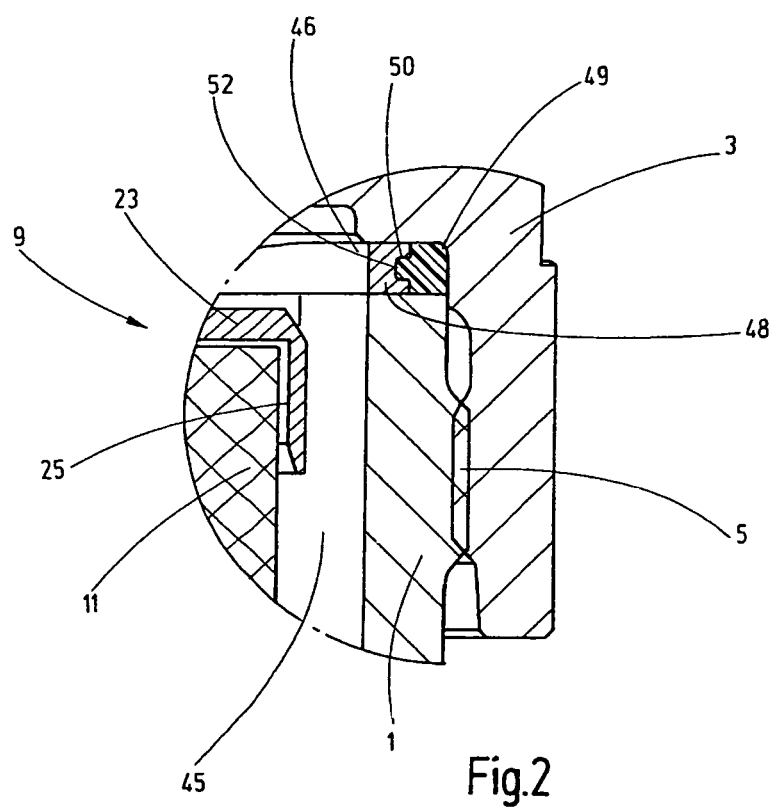
FIG. 2 is an enlarged partial side elevational view in section of the region designated as X in FIG. 1.

In the example of FIGS. 1 and 2, the sealing element of the sealing arrangement is an annular body 49. As is best illustrated in FIG. 2, it has a largely square cross sectional shape whose axially opposing surfaces form sealing surfaces for contact with the cover part 3 and the end edge of the opening of the housing 1. As can likewise be clearly seen in FIG. 2, the annular body 49 is fixed on the peripheral part 48 such that a retaining rib 50 projecting radially inward from the annular body 49 is secured in a peripheral annular groove 52 on the peripheral part 48 forming the seal carrier.

FIG. 3 illustrates one modified embodiment in which the sealing arrangement as the sealing element has a profile ring seal 57 having sealing lips 59 opposite one another projecting out of the essentially rectangular cross sectional shape in the axial direction and forming the sealing relative to the cover part 3 and the housing 1. This profile ring seal 57 is secured on the peripheral part 48 of the filter element 9 forming the seal carrier. An outer ring 55 projects radially from the peripheral part 48 and has a dovetail outline to engage a dovetail-shaped recess formed inside on the profile ring seal 57, see FIG. 3.

In the embodiments as shown in FIGS. 1 to 3, as the movable coupling part for the fluid connection between the filter cavity 47 forming the clean side and the fluid duct 35 in the cover part 3, a sleeve body 33 is guided to be axially displaceable within the guide 31. The hollow body 27 connected to the end cap 23 and forming part of the guide 31 on its inner end region has a shape projecting radially inward and forming a stop shoulder 61 on which one end of a helical compression spring 63 is supported within the sleeve body 33. A spring 63 adjoins sleeve body inside ribs 65 (only a few being numbered in FIG. 3), with its other end on the inner ring shoulder 67 of the sleeve body 33. For the sleeve body 33, this arrangement pretensions the spring for axial motion in the direction to the cover part 3. To limit this motion in the end position, the extension 29 forming part of the guide 31 has a step 69 constricting the guide and interacting with a step 70 on the outer periphery of the sleeve body 33 for limiting the end position. FIGS. 1 and 3 illustrate the operating state of the filter device when the cover part 3 has been screwed on housing 1 and the sleeve body 33 is pushed out of its end position against the pretensioning of the compression spring 63 axially into the filter element 9. This movement is due to the mouth edge 71 of the cover-side fluid duct 35 as the stationary coupling part of the connecting means for forming the coupling connection when the cover part 3 is screwed tight pressing on the sleeve end edge 73 of the sleeve body 33 and pushing it out of the end position. The pretensioning of the compression spring 63 is then active as sealing force between the mouth edge 71 of the fluid duct 35 and the sleeve end edge 73 of the sleeve body 33. In other words, the coupling connection of the connecting means is automatically established when the device is shifted into the operating state by screwing the cover part 3 onto the housing 1 containing the pertinent filter element 9.

The interacting regions of the sleeve body 33 and the fluid duct 35, which in the coupling state form the sealing, are made such that one of the annular surfaces pressed against one another by the pretensioning of the spring forms a continuous radial plane, while the other ring surface forms a radial plane with a sealing edge projecting out of it. In these embodiments, the ring surface 75 on the fluid duct 35 is continuously level, while the ring surface 77 along its peripheral edge forms a slightly projecting sealing edge 79. The sealing edge 79 with the radially outer edge of the ring surface 75 forms a seal in interaction with its surface edge. Additionally, by the edge enclosure of the mouth edge 71 of the fluid duct 35, sealing edge 79 forms centering mechanism. When the cover part 3 is screwed on, a high-precision alignment of the coupling connection of the connection means necessarily takes place. Considering that the filter element 9, aside from the compression spring 63, can be made without metal such that mechanical or thermal effects could lead to slight deformations, this centering constitutes an extremely advantageous contribution to the operating reliability of the device.

In the described design of the coupling device, the spring-loaded sleeve body 33 also forms the movable valve body of a bypass valve. When a pressure difference rises, i.e., when the pressure difference between the space between the steps 69 and 70 on the extension 39 and the sleeve body 33 and the inner filter cavity 47 rises to a threshold valve, the sleeve body 33 moves against the force of the spring 63. Between the ring surface 75 on the end edge 73 of the sleeve and the mouth edge 71, the ring surfaces 75 and 77 are spaced by a distance forming a direct connection between the fluid duct 41 and the fluid duct 35 in the cover part 3.

Figure 4:
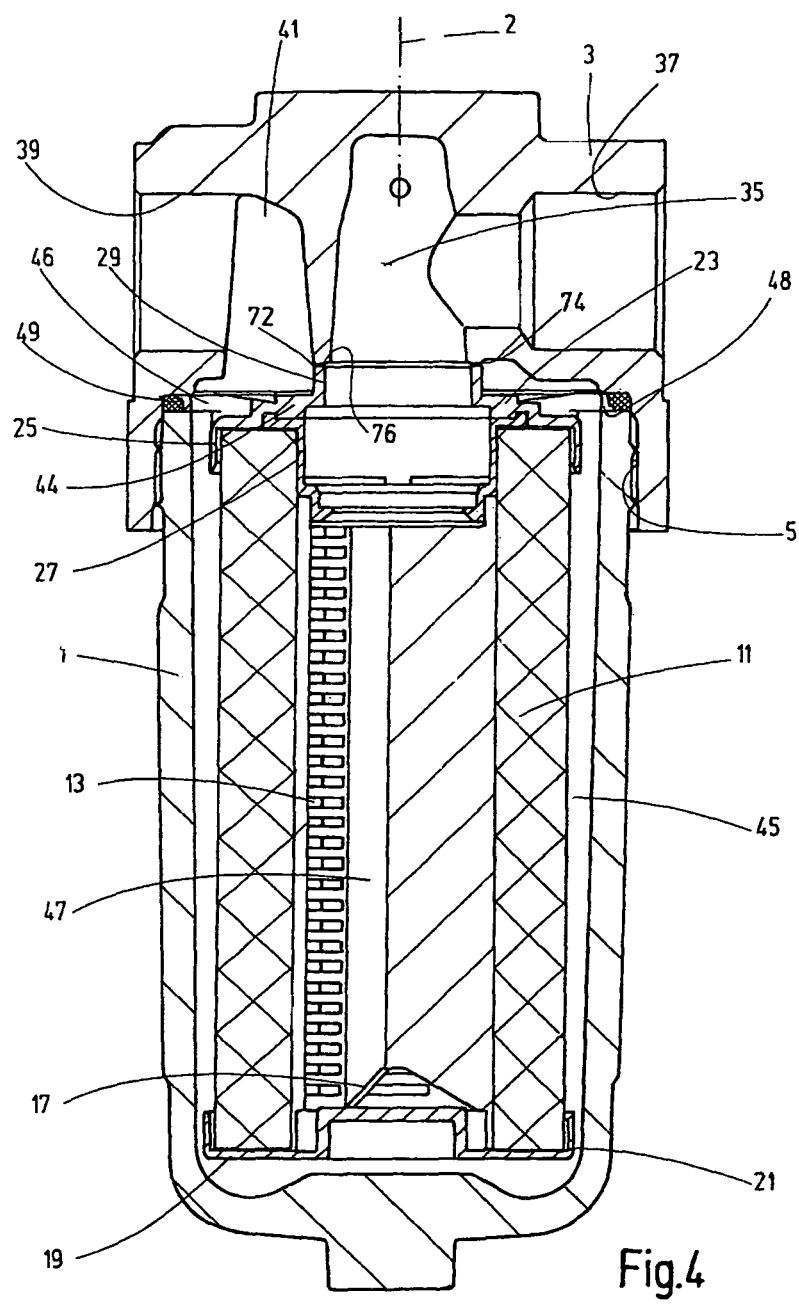
FIG. 4 is a side elevational view in section of a filter device according to a third exemplary embodiment according to the invention.

FIG. 4 illustrates another or third exemplary embodiment without the bypass valve integrated into it. In the above described embodiments, the fluid connection between the filter cavity 47 forming the clean side and the fluid duct 35 in the cover part 3 takes place by an axially movable coupling part formed by the sleeve body 33 guided to be axially displaceable in the central part 44 of the end cap 23. In the example of FIG. 4, the axial extension 29 of the end cap 23 forms the end-side sealing surface, i.e., the mouth edge 72 of the extension 29 assumes the function of the sleeve end edge 73 of the sleeve body 33 of the above described embodiments. Accordingly, the end edge of the extension 29 on the end side has a ring surface 76 which is not continuously even corresponding to the ring surface 77 in the above described examples. Instead, extension 29 forms a slightly projecting sealing edge 79 along its peripheral edge. The sealing edge interacts to form a seal with the ring surface 74 which on the mouth edge of the fluid duct 35 is made continuously even. With the cover part 3 screwed on, by the interaction of the ring surfaces 74 and 76 as well as the projecting sealing edge 79 (the latter not being shown in FIG. 4), sealing on the fluid connection is formed. Otherwise, the embodiment from FIG. 4, particularly with regard to the sealing arrangement forming a component of the filter element 9, corresponds to the above described examples.

While various embodiments have been chosen to illustrate the invention, it will be understood by those skilled in the art that various changes and modifications can be made therein without departing from the scope of the invention as defined in the appended claims.

What is claimed is:

1. A filter device, comprising:
   a filter housing;
   a cover part closing said housing and having a fluid ducts;
   a filter element received in said housing, having a body with a filter medium extending along a longitudinal axis and having an end cap with a seal carrier securely connected thereto and forming an annular peripheral part thereof, said end cap forming an enclosure for said filter medium on an end thereof adjacent said cover part, said seal carrier being radially offset from a central part of said end cap relative to said longitudinal axis, said annular peripheral part being connected to said central part of said end cap only by radially extending crosspieces molded in one piece with said central part of said end cap, intermediate spaces between said crosspieces forming sector-shaped fluid passages in an operating state of the filter device providing fluid communication between said fluid duct and an outside of said filter element, said end cap having a cylindrical guide receiving a sleeve body and guiding said sleeve body for axial displacement in said cylindrical guide, said sleeve body providing a movable coupling part producing a fluid connection between said filter element and one of said fluid ducts;
   an inner seal between said sleeve body and said cylindrical guide sealing said sleeve body relative to said cylindrical guide; and
   an outer seal forming a fluid-tight connection between said housing and said cover part, being a component of said filter element and being fixed on said seal carrier.

2. A filter device according to claim 1 wherein
said outer seal comprises an annular body having an inner retaining rib projecting radially inward and being secured in a peripheral groove on said annular peripheral part of said seal carrier.

3. A filter device according to claim 1 wherein
said outer seal comprises a profile seal having a radial recess securely engaged by a dovetail-shaped outer ring of said annular peripheral part of said seal carrier.

4. A filter device according to claim 3 wherein
said profile seal comprises two lips extending in opposite axial directions parallel to said longitudinal axis with each of said lips forming a sealing region on said cover part and said filter housing, respectively.

5. A filter element, comprising:
   a body with a filter medium extending along a longitudinal axis;
   an end cap with a seal carrier securely connected thereto and forming an annular peripheral part thereof, said end cap forming an enclosure for said filter medium on an end thereof, said seal carrier being radially offset from a central part of said end cap relative to said longitudinal axis, said annular peripheral part being connected to said central part of said end cap only by radially extending crosspieces molded in one piece with said central part of said end cap, intermediate spaces between said crosspieces forming sector-shaped fluid passages in an operating state of the filter element, said end cap having a cylindrical guide receiving a sleeve body and guiding said sleeve body for axial displacement in said cylindrical guide, said sleeve body providing a movable coupling part producing a fluid connection between the filter element and a fluid duct in a filter housing assembly;
   an inner seal between said sleeve body and said cylindrical guide sealing said sleeve body relative to said cylindrical guide; and
   an outer seal being a component of the filter element and being fixed on said seal carrier, said outer seal having a body.

6. A filter element according to claim 5 wherein
said outer seal comprises an annular body having an inner retaining rib projecting radially inward and being secured in a peripheral groove on said annular peripheral part of said seal carrier.

7. A filter element according to claim 5 wherein
said outer seal comprises a profile seal having a radial recess securely engaged by a dovetail-shaped outer ring of said annular peripheral part of said seal carrier.

8. A filter element according to claim 7 wherein
said profile seal comprises two lips extending in opposite axial directions parallel to said longitudinal axis.

* * * * *